(12) United States Patent
Kuo

(10) Patent No.: US 7,396,462 B2
(45) Date of Patent: Jul. 8, 2008

(54) FILTERING DEVICE

(75) Inventor: Yu-Shan Kuo, Taichung (TW)

(73) Assignee: Chi-Chang Kuo, Taichung (TW)

( * ) Notice: Subject to any disclaimer, the term of this patent is extended or adjusted under 35 U.S.C. 154(b) by 387 days.

(21) Appl. No.: 11/326,141

(22) Filed: Jan. 5, 2006

(65) Prior Publication Data

US 2007/0084780 A1    Apr. 19, 2007

(51) Int. Cl.
*B01D 35/22*  (2006.01)
*B01D 29/54*  (2006.01)
*B01D 65/02*  (2006.01)
*B01D 63/08*  (2006.01)
*B01D 63/16*  (2006.01)
*B01D 63/00*  (2006.01)

(52) U.S. Cl. ............ 210/321.63; 210/321.69; 210/415; 210/409; 210/332

(58) Field of Classification Search ............. 210/321.63
See application file for complete search history.

(56) References Cited

U.S. PATENT DOCUMENTS 3,251,469 A * 5/1966 Muller .................. 210/771
3,870,636 A * 3/1975 Schettler ................ 210/236
3,948,778 A * 4/1976 Muller .................. 210/330
3,989,626 A * 11/1976 Bentley et al. ........... 210/177
4,066,546 A * 1/1978 Sasaki .................. 210/660
4,330,405 A * 5/1982 Davis et al. ............. 210/331
4,698,156 A * 10/1987 Bumpers ................ 210/331
4,708,797 A * 11/1987 Baur et al. ............. 210/330
6,306,307 B1 * 10/2001 McGregor et al. ........ 210/640
7,267,236 B2 * 9/2007 Kuo ..................... 210/415

OTHER PUBLICATIONS

U.S. Appl. No. 11/325,769, filed Jan. 5, 2006, entitled "Filtering Device" by Yu-Shan Kuo, 13 pages.

* cited by examiner

*Primary Examiner*—Krishnan S Menon
(74) *Attorney, Agent, or Firm*—Pai Patent and Trademark Law Firm; Chao-Chang David Pai

(57) ABSTRACT

A filtering device includes: a fluid-collecting tube; a plurality of positioning trays sleeved around the fluid-collecting tube and stacked one above the other; and a plurality of membranes alternating with the positioning trays. Each of the membranes is sandwiched between an adjacent pair of the positioning trays. Each of the positioning trays includes first and second engaging members. Each adjacent pair of the positioning trays are coupled to each other and are rotatable relative to each other between a first relative position and a second relative position. The first engaging member of each of the positioning trays is engageable with the second engaging member of an adjacent one of the positioning trays.

7 Claims, 6 Drawing Sheets

//FILTERING DEVICE

BACKGROUND OF THE INVENTION

1. Field of the Invention

The invention relates to a filtering device, more particularly to a filtering device including a plurality of positioning trays sleeved around a fluid-collecting tube, and a plurality of membranes alternating with the positioning trays.

2. Description of the Related Art

Conventional filtering devices normally include a plurality of frames and membranes that are assembled together. The fluid to be filtered enters one end of the assembly of the framed membranes, and is discharged from an opposite end of the assembly of the framed membranes. Assembly of the framed membranes is required to be very careful so as to prevent leakage from occurring during filtering operation. As a consequence, assembly of the frames and the membranes of the conventional filtering device in a manner to prevent leakage from occurring is relatively difficult to achieve. Hence, there is a need to design a filtering device that is easy to assemble without causing leakage.

SUMMARY OF THE INVENTION

Therefore, the main object of the present invention is to provide a filtering device that can overcome the aforesaid drawback associated with the prior art.

Accordingly, a filtering device of this invention comprises: a fluid-collecting tube defining a fluid channel therein and formed with a plurality of apertures that are in fluid communication with the fluid channel; a plurality of positioning trays sleeved around the fluid-collecting tube and stacked one above the other; and a plurality of membranes alternating with the positioning trays and disposed around the fluid-collecting tube. Each of the membranes is sandwiched between an adjacent pair of the positioning trays. Each of the positioning trays includes an annular plate that is sleeved around the fluid-collecting tube and that is formed with a plurality of annularly displaced arcuate holes around the fluid-collecting tube. Each of the arcuate holes has opposite first and second ends. The annular plate of each of the positioning trays is provided with a plurality of first engaging members, each of which is disposed adjacent to the first end of a respective one of the arcuate holes, and a plurality of second engaging members, each of which is disposed adjacent to the second end of a respective one of the arcuate holes. The annular plates of each adjacent pair of the positioning trays are coupled to each other and are rotatable relative to each other between a first relative position and a second relative position offset from the first relative position. The first engaging member of one of the annular plates of each adjacent pair of the positioning trays is disengaged from the second engaging member of the other of the annular plates of each adjacent pair of the positioning trays when the annular plates of each adjacent pair of the positioning trays are disposed at the first relative position. The first engaging member of said one of the annular plates of each adjacent pair of the positioning trays engages releasably the second engaging member of the other of the annular plates of each adjacent pair of the positioning trays when the annular plates of each adjacent pair of the positioning trays are disposed at the second relative position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
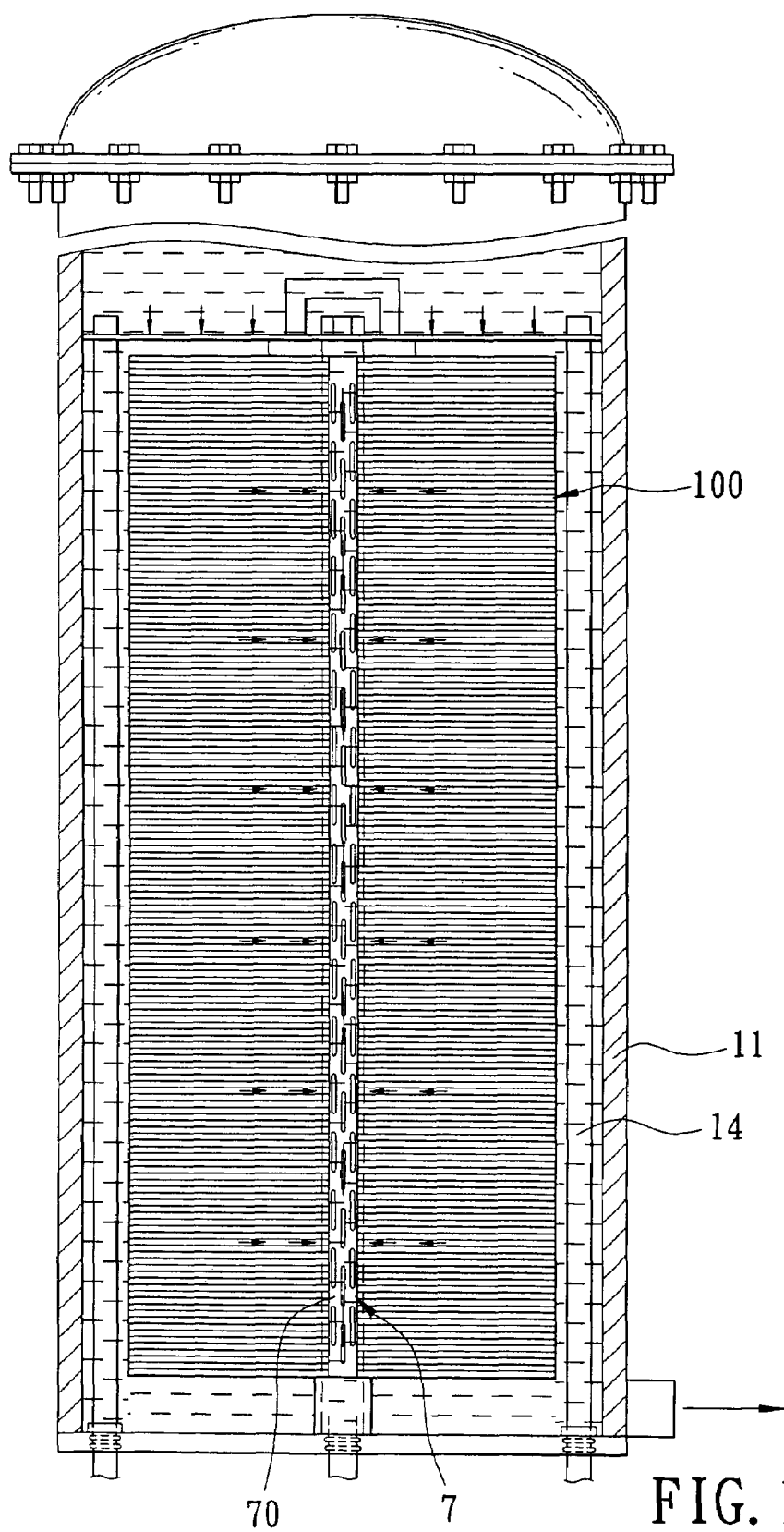
FIG. 1 is a fragmentary exploded perspective view of the first preferred embodiment of the filtering device according to the present invention.
Figure 2:
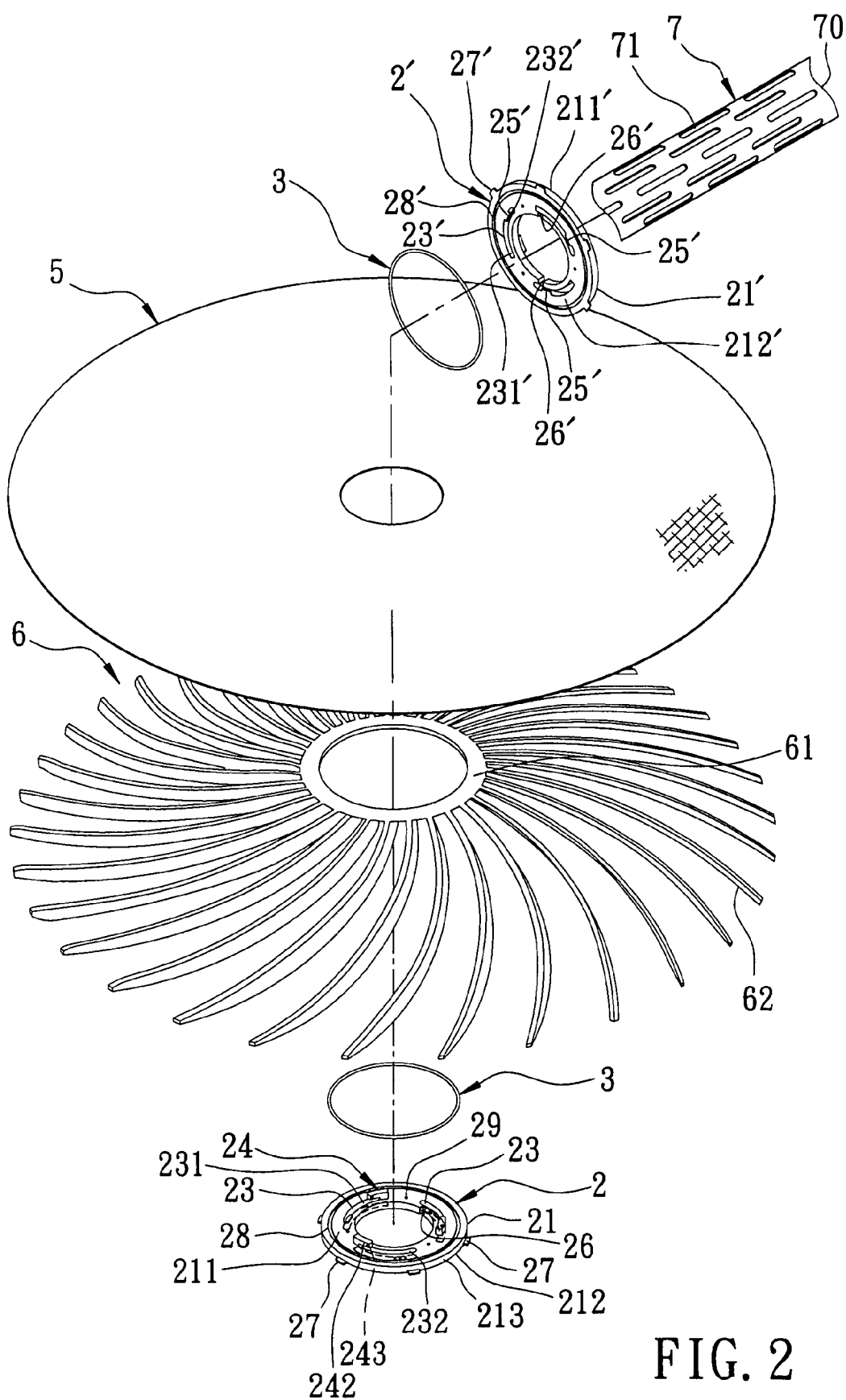
FIG. 2 is an exploded perspective view of an assembly of a membrane, a stirring member, and an adjacent pair of positioning trays of the first preferred embodiment.
Figure 3:
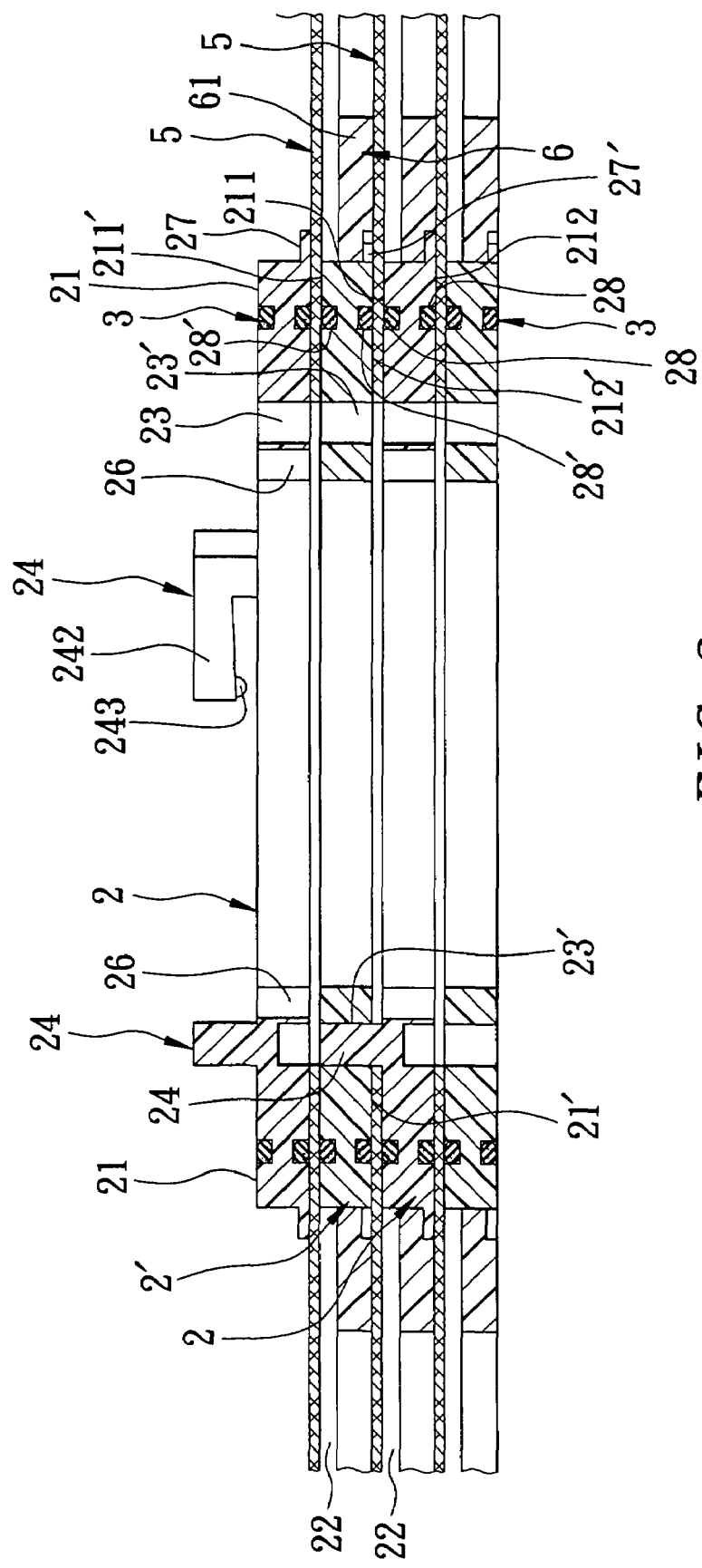
FIG. 3 is a fragmentary sectional view of an assembly of the membranes, the stirring members, and the positioning trays of the first preferred embodiment.

Before the present invention is described in greater detail with reference to the accompanying preferred embodiments, it should be noted herein that like elements are denoted by the same reference numerals throughout the disclosure.

Referring to FIGS. 1 to 4, the first preferred embodiment of a filtering device according to the present invention is shown to include a column 11 with a fluid inlet (not shown) and a fluid outlet, and a filtering unit 100 mounted in the column 11. Several water-injecting tubes 14 are mounted in the column 11 for cleaning purposes.

Figure 4:
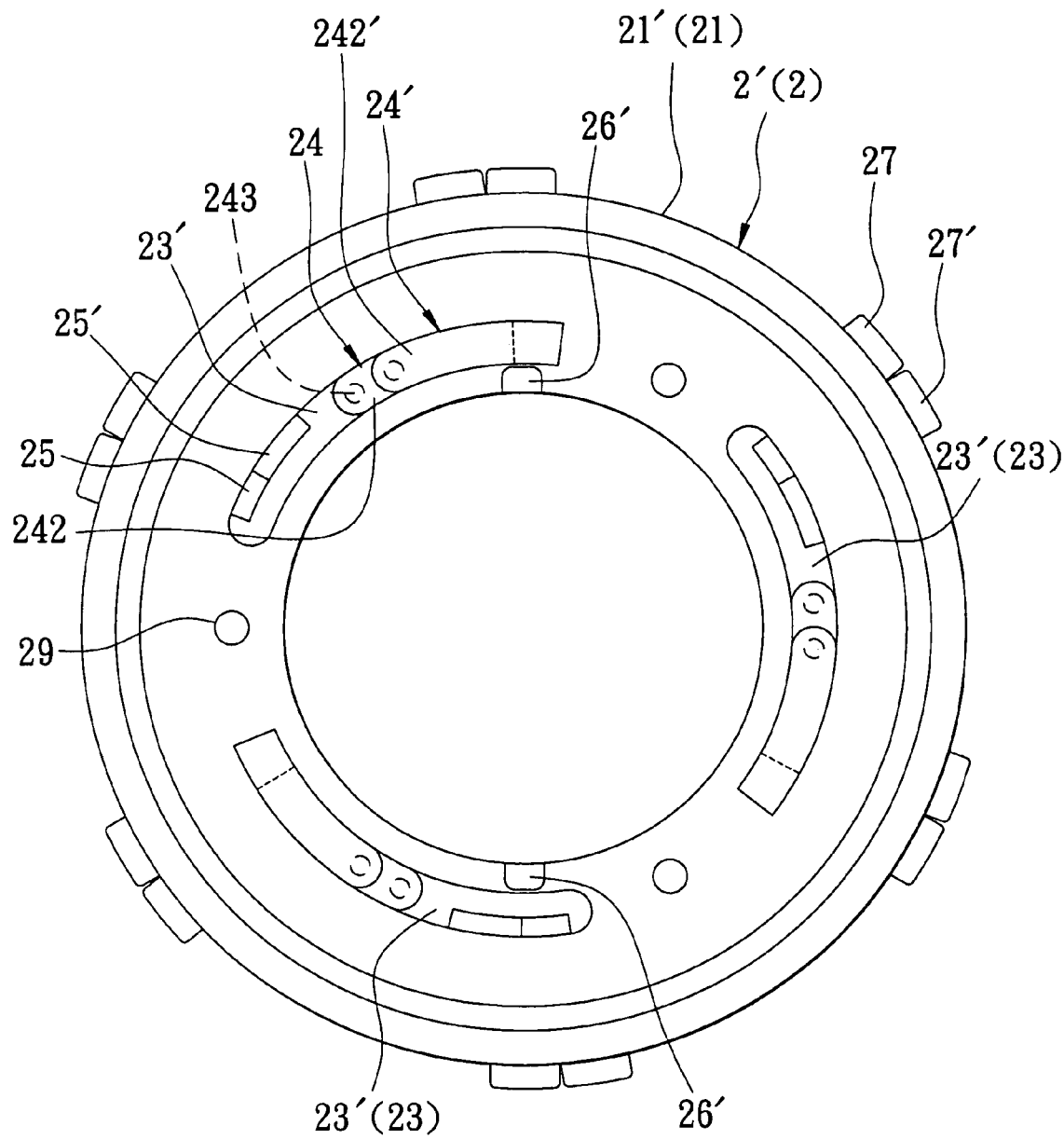
FIG. 4 is a schematic top view to illustrate a state where an adjacent pair of the positioning trays of the first preferred embodiment are disposed at a first relative position.
Figure 5:
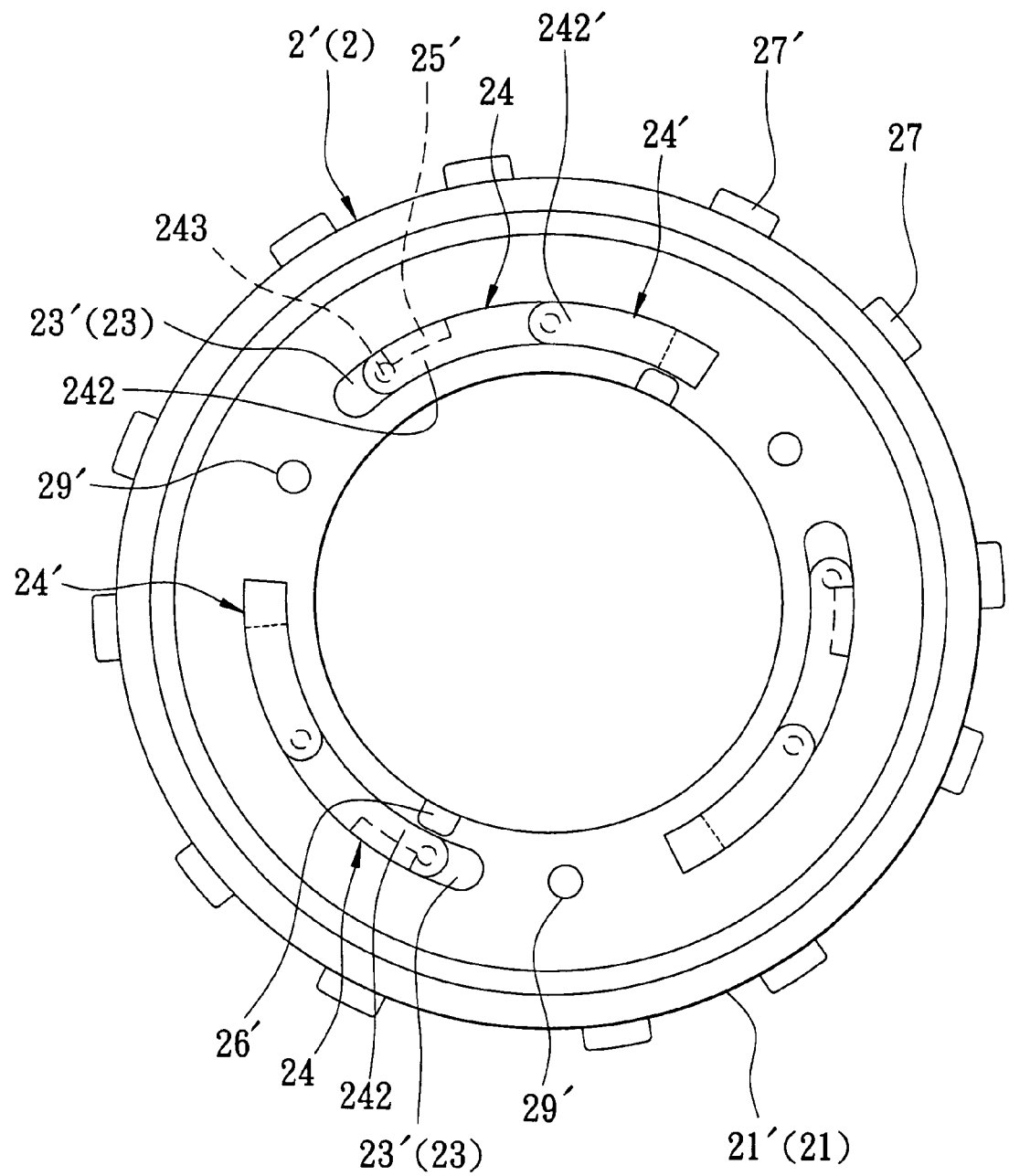
FIG. 5 is a schematic top view to illustrate another state where an adjacent pair of the positioning trays of the first preferred embodiment are disposed at a second relative position.

The filtering unit 100 includes: a fluid-collecting tube 7 defining a fluid channel 70 therein and formed with a plurality of apertures 71 (see FIG. 2) that are in fluid communication with the fluid channel 70; a plurality of positioning trays 2 (2') (the reference numerals for each two adjacent ones of the positioning trays are respectively numbered 2 and 2' for the sake of clarity in the following description) sleeved around the fluid-collecting tube 7 and stacked one above the other; and a plurality of membranes 5 alternating with the positioning trays 2 (2') and disposed around the fluid-collecting tube 7. Each of the membranes 5 is sandwiched between an adjacent pair of the positioning trays 2, 2'. Each of the positioning trays 2 (2') includes an annular plate 21 (21') that is sleeved around the fluid-collecting tube 7 and that is formed with a plurality of annularly displaced arcuate holes 23 (23') around the fluid-collecting tube 7. Each of the arcuate holes 23 (23') has opposite first and second ends 231, 232 (231', 232'). The annular plate 21 (21') of each of the positioning trays 2 (2') is provided with a plurality of first engaging members 24 (24'), each of which is disposed adjacent to the first end 231 (231') of a respective one of the arcuate holes 23 (23') and a plurality of second engaging members 25 (25'), each of which is disposed adjacent to the second end 232 (232') of a respective one of the arcuate holes 23 (23'). The annular plates 21, 21' of each adjacent pair of the positioning trays 2, 2' are coupled to each other and are rotatable relative to each other between a first relative position and a second relative position offset from the first relative position. The first engaging member 24 of one of the annular plates 21 of each adjacent pair of the positioning trays 2, 2' is disengaged from the second engaging member 25' of the other of the annular plates 21' of each adjacent pair of the positioning trays 2, 2' when the annular plates 21, 21' of each adjacent pair of the positioning trays 2, 2' are disposed at the first relative position, as best shown in FIG. 4. The first engaging member 24 of said one of the annular plates 21 of each adjacent pair of the positioning trays 2, 2' engages releasably the second engaging member 25' of the other of the annular plates 21' of each adjacent pair of the positioning trays 2, 2' when the annular plates 21, 21' of each adjacent pair of the positioning trays 2, 2' are disposed at the second relative position, as best shown in FIG. 5.

In this embodiment, the first engaging member 24 of said one of the annular plates 21 of each adjacent pair of the positioning trays 2, 2' is angularly offset from the second engaging member 25' of the other of the annular plates 21' of each adjacent pair of the positioning trays 2, 2' when the annular plates 21, 21' of each adjacent pair of the positioning trays 2, 2' are disposed at the first relative position, thereby permitting disassembly of the adjacent pair of the positioning trays 2, 2'. The first engaging member 24 of said one of the annular plates 21 of each adjacent pair of the positioning trays 2, 2' is axially aligned with the second engaging member 25' of the other of the annular plates 21' of each adjacent pair of the positioning trays 2, 2' when the annular plates 21, 21' of each adjacent pair of the positioning trays 2, 2' are disposed at the second relative position, thereby preventing disassembly of the adjacent pair of the positioning trays 2, 2'.

Preferably, the annular plate 21 (21') of each of the positioning trays 2 (2') is formed with a plurality of first arcuate protrusions, each of which defines a respective one of the first engaging members 24 (24') and each of which projects axially and outwardly therefrom, and a plurality of second arcuate protrusions, each of which defines a respective one of the second engaging members 25 (25') and each of which projects therefrom into a respective one of the arcuate holes 23 (23') in the annular plate 21 (21') of the respective one of the positioning trays 2 (2') Each of the first arcuate protrusions of said one of the annular plates 21 of each adjacent pair of the positioning trays 2, 2' extends through a respective one of the arcuate holes 23' in the other of the annular plates 21' of each adjacent pair of the positioning trays 2, 2'.

Preferably, each of the first arcuate protrusions of the annular plate 21 (21') of each of the positioning trays 2 (2') has an inverted L-shape, projects axially from a periphery of the first end 231 (231') of the respective one of the arcuate holes 23 (23'), and has a free end portion 242 (242') extending toward the second end 232 (232') of the respective one of the arcuate holes 23 (23'). Each of the second arcuate protrusions of the annular plate 21 (21') of each of the positioning trays 2 (2') projects radially and inwardly from a hole-defining wall of the respective one of the arcuate holes 23 (23'). The free end portion 242 of each of the first arcuate protrusions of said one of the annular plates 21 of each adjacent pair of the positioning trays 2 is axially aligned with the respective one of the second arcuate protrusions (25') of the other of the annular plates 21' of each adjacent pair of the positioning trays 2, 2' when the annular plates 21, 21' of each adjacent pair of the positioning trays 2, 2' are disposed at the second relative position, and is offset from the respective one of the second arcuate protrusions (25') of the other of the annular plates 21' of each adjacent pair of the positioning trays 2, 2' when the annular plates 21, 21' of each adjacent pair of the positioning trays 2, 2' are disposed at the first relative position.

Preferably, the free end portion 242 (242') of each of the first arcuate protrusions of each of the annular plates 21 (21') is further formed with a protrusion 243 (243') such that the protrusion 243 of each of the first arcuate protrusions of said one of the annular plates 21 of each adjacent pair of the positioning trays 2, 2' abuts against a corner of the respective one of the second arcuate protrusions 25' of the other of the annular plate 21' of each adjacent pair of the positioning trays 2, 2' when the annular plates 21, 21' of each adjacent pair of the positioning trays 2, 2' are disposed at the second relative position, as best shown in FIG. 5.

The annular plate 21 (21') of each of the positioning trays 2 (2') has upper and lower surfaces 211, 212 (211', 212'), and is further formed with upper and lower annular recesses 28 (28') indented inwardly and respectively from the upper and lower surfaces 211, 212 (211', 212') The filtering device further includes upper and lower sealing rings 3 that are respectively disposed in the upper and lower annular recesses 28 (28') in the annular plate 21 (21') of each of the positioning trays 2 (2') and that are respectively in sealing contact with an adjacent pair of the membranes 5.

In this embodiment, the annular plate 21 (21') of each of the positioning trays 2 (2') has a peripheral edge 213 (213') formed with a plurality of retaining tabs 27 (27'). Each two adjacent ones of the membranes 5 cooperatively define a gap 22 therebetween. The filtering device further includes a plurality of stirring members 6, each of which is disposed in the gap 22 between two adjacent ones of the membranes 5 and each of which has a ring-shaped hub 61 rotatably sleeved on the annular plate 21 (21') of a respective one of the positioning trays 2 (2'), and a plurality of blades 62 extending outwardly and curvedly from the ring-shaped hub 61 such that when performing a membrane cleaning operation, the stirring members 5 can be driven by an injected water body in the fluid-collecting tube 7 to rotate relative to the annular plates 21 (21'), thereby removing filtered solids from the membranes 5. The retaining tabs 27 (27') of each of the annular plates 21 (21') serve to retain the respective stirring member 5 thereon. In addition, each of the annular plates 21 (21') of each of the positioning trays 2 (2') is further formed with a plurality of liquid-guiding openings 26 (26') in fluid communication with the fluid-collecting tube 7.

Preferably, the annular plate 21 (21') of each of the positioning trays 2 (2') is further formed with a plurality of accessing holes 29 (29') for facilitating detachment of each adjacent pair of the positioning trays 2, 2.

Figure 6:
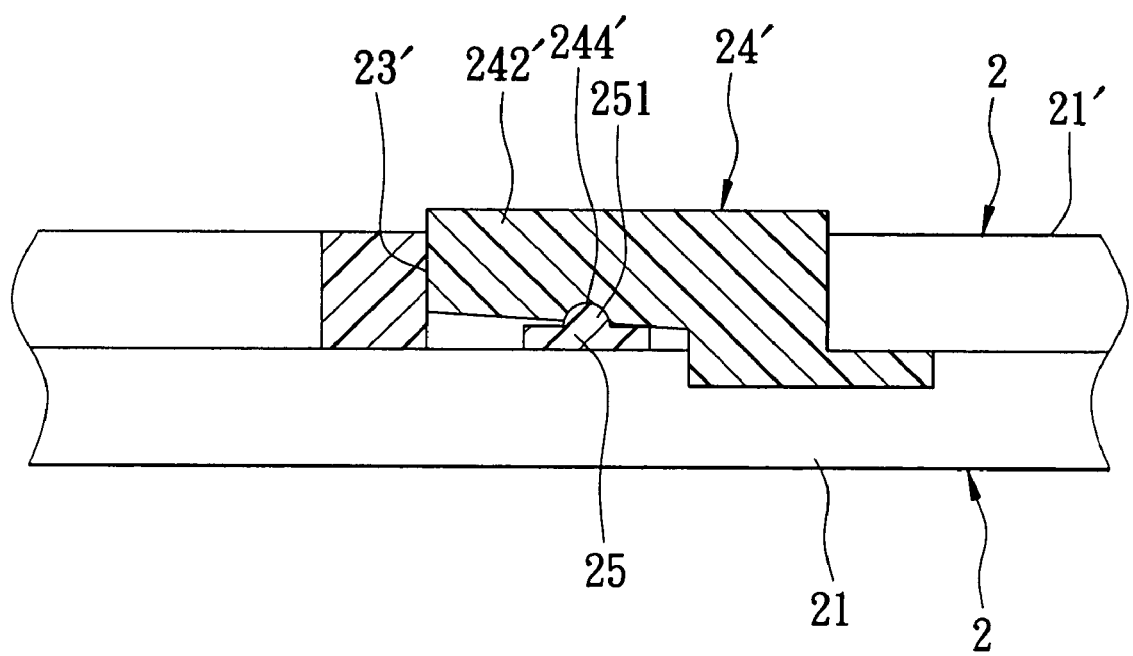
FIG. 6 is fragmentary sectional view of an adjacent pair of the positioning trays of the filtering device of the second preferred embodiment according to the present invention.

Referring to FIG. 6, the second preferred embodiment of the filtering device of this invention differs from the previous embodiment in that the free end portion 242' of each of the first arcuate protrusions of the annular plate 21' of each of the positioning trays 2' is formed with a retaining groove 244'. Each of the second arcuate protrusions of the annular plate 21 of each of the positioning trays 2 is formed with a tongue 251. The tongue 251 of each of the second arcuate protrusions of said one of the annular plates 21 of each adjacent pair of the positioning trays 2, 2' engages the retaining groove 244' in the free end portion 242' of the respective one of the first arcuate protrusions of the other of the annular plates 21' of each adjacent pair of the positioning trays 2, 2' when the annular plates 21, 21' of each adjacent pair of the positioning trays 2, 2' are disposed at the second relative position.

With the inclusion of the positioning trays 2 (2') in the filtering device of this invention, the aforesaid drawback associated with the prior art can be mitigated.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A filtering device comprising:

a fluid-collecting tube defining a fluid channel therein and formed with a plurality of apertures that are in fluid communication with said fluid channel;

a plurality of positioning trays sleeved around said fluid-collecting tube and stacked one above the other; and a plurality of membranes alternating with said positioning trays and disposed around said fluid-collecting tube, each of said membranes being sandwiched between an adjacent pair of said positioning trays;

wherein each of said positioning trays includes an annular plate that is sleeved around said fluid-collecting tube and that is formed with a plurality of annularly displaced arcuate holes around said fluid-collecting tube, each of said arcuate holes having opposite first and second ends, said annular plate of each of said positioning trays being provided with a plurality of first engaging members, each of which is disposed adjacent to said first end of a respective one of said arcuate holes, and a plurality of second engaging members, each of which is disposed adjacent to said second end of a respective one of said arcuate holes;

wherein said annular plates of each adjacent pair of said positioning trays are coupled to each other and are rotatable relative to each other between a first relative position and a second relative position offset from the first relative position; and wherein said first engaging member of one of said annular plates of each adjacent pair of said positioning trays is disengaged from said second engaging member of the other of said annular plates of each adjacent pair of said positioning trays when said annular plates of each adjacent pair of said positioning trays are disposed at the first relative position, and said first engaging member of said one of said annular plates of each adjacent pair of said positioning trays engages releasably said second engaging member of the other of said annular plates of each adjacent pair of said positioning trays when said annular plates of each adjacent pair of said positioning trays are disposed at the second relative position.

2. The filtering device as claimed in claim 1, wherein said first engaging member of said one of said annular plates of each adjacent pair of said positioning trays is angularly offset from said second engaging member of the other of said annular plates of each adjacent pair of said positioning trays when said annular plates of each adjacent pair of said positioning trays are disposed at the first relative position, and said first engaging member of said one of said annular plates of each adjacent pair of said positioning trays is axially aligned with said second engaging member of the other of said annular plates of each adjacent pair of said positioning trays when said annular plates of each adjacent pair of said positioning trays are disposed at the second relative position.

3. The filtering device as claimed in claim 2, wherein said annular plate of each of said positioning trays is formed with a plurality of first arcuate protrusions, each of which defines a respective one of said first engaging members and each of which projects axially and outwardly therefrom, said annular plate of each of said positioning trays being further formed with a plurality of second arcuate protrusions, each of which defines a respective one of said second engaging members and each of which projects therefrom into a respective one of said arcuate holes in said annular plate of the respective one of said positioning trays, each of said first arcuate protrusions of one of said annular plates of each adjacent pair of said positioning trays extending through a respective one of said arcuate holes in the other of said annular plates of each adjacent pair of said positioning trays.

4. The filtering device as claimed in claim 3, wherein each of said first arcuate protrusions of said annular plate of each of said positioning trays has an inverted L-shape, projects axially from a periphery of said first end of the respective one of said arcuate holes, and has a free end portion extending toward said second end of the respective one of said arcuate holes, each of said arcuate holes being defined by a hole-defining wall, each of said second arcuate protrusions of said annular plate of each of said positioning trays projecting radially and inwardly from said hole-defining wall of the respective one of said arcuate holes, said free end portion of each of said first arcuate protrusions of said one of said annular plates of each adjacent pair of said positioning trays being axially aligned with the respective one of said second arcuate protrusions of the other of said annular plates of each adjacent pair of said positioning trays when said annular plates of each adjacent pair of said positioning trays are disposed at the second relative position, and being offset from the respective one of said second arcuate protrusions of the other of said annular plates of each adjacent pair of said positioning trays when said annular plates of each adjacent pair of said positioning trays are disposed at the first relative position.

5. The filtering device as claimed in claim 4, wherein said free end portion of each of said first arcuate protrusions of said annular plate of each of said positioning trays is formed with a retaining groove, each of said second arcuate protrusions of said annular plate of each of said positioning trays being formed with a tongue, said tongue of each of said second arcuate protrusions of one of said annular plates of each adjacent pair of said positioning trays engaging said retaining groove in said free end portion of the respective one of said first arcuate protrusions of the other of said annular plates of each adjacent pair of said positioning trays when said annular plates of each adjacent pair of said positioning trays are disposed at the second relative position.

6. The filtering device as claimed in claim 1, wherein said annular plate of each of said positioning trays has upper and lower surfaces, and is further formed with upper and lower annular recesses indented inwardly and respectively from said upper and lower surfaces, said filtering device further comprising upper and lower sealing rings that are respectively disposed in said upper and lower annular recesses in said annular plate of each of said positioning trays and that are respectively in sealing contact with an adjacent pair of said membranes.

7. The filtering device as claimed in claim 1, wherein each two adjacent ones of said membranes cooperatively define a gap therebetween, said filtering device further comprising a plurality of stirring members, each of which is disposed in said gap between two adjacent ones of said membranes and each of which has a hub rotatably sleeved on said annular plate of a respective one of said positioning trays, and a plurality of blades extending outwardly and curvedly from said hub.

* * * * *